United States Patent
Chen

(12) 
(10) Patent No.: US 7,103,629 B2
(45) Date of Patent: Sep. 5, 2006

(54) METHOD FOR EFFECTING WEB-BASED NETWORK MANAGER USING WEB CONFIGURATION

(75) Inventor: Yung-Hsin Chen, Hsinchu (TW)

(73) Assignee: D-Link Corporation, Hsinchu (TW)

( * ) Notice: Subject to any disclaimer, the term of this patent is extended or adjusted under 35 U.S.C. 154(b) by 724 days.

(21) Appl. No.: 10/040,410

(22) Filed: Jan. 9, 2002

(65) Prior Publication Data

US 2003/0131086 A1    Jul. 10, 2003

(51) Int. Cl.
G06F 15/16 (2006.01)
G06F 15/177 (2006.01)
G06F 15/173 (2006.01)
G06F 3/00 (2006.01)

(52) U.S. Cl. .................. 709/203; 709/223; 709/226; 719/317

(58) Field of Classification Search ........... 709/217, 709/218, 219, 223, 225, 226, 227, 228, 230, 709/224, 203, 220, 229; 719/317
See application file for complete search history.

(56) References Cited

U.S. PATENT DOCUMENTS

| | | | |
|---|---|---|---|
| 6,490,617 B1 * | 12/2002 | Hemphill et al. ........... | 709/223 |
| 6,526,442 B1 * | 2/2003 | Stupek et al. ............... | 709/224 |
| 6,718,361 B1 * | 4/2004 | Basani et al. ............... | 709/201 |
| 6,845,505 B1 * | 1/2005 | Adunuthula et al. ........ | 718/105 |
| 6,854,016 B1 * | 2/2005 | Kraenzel et al. ............ | 709/229 |
| 6,854,120 B1 * | 2/2005 | Lo et al. ..................... | 719/311 |
| 2001/0054064 A1 * | 12/2001 | Kannan ..................... | 709/203 |
| 2004/0123302 A1 * | 6/2004 | Lo et al. ..................... | 719/310 |

* cited by examiner

*Primary Examiner*—Zarni Maung
*Assistant Examiner*—El Hadj M. Sall

(74) *Attorney, Agent, or Firm*—Bacon & Thomas, PLLC

(57) ABSTRACT

A method for effecting Web-based network manager using Web configuration comprises the steps of establishing a manager process module and a manager database module on a workstation; operating the manager database module to use a Hyperlink feature of Hypertext contained in a HTML file to activate a Web browser; enabling a connection to each network device based on node information of each network device stored in the manager database module; and obtaining status information of each network device in a domain from an embedded Web agent in the network device, so as to directly manage network devices through Web browser without additionally installing a management module in the workstation.

4 Claims, 3 Drawing Sheets

METHOD FOR EFFECTING WEB-BASED NETWORK MANAGER USING WEB CONFIGURATION

FIELD OF THE INVENTION

The present invention relates to network and more particularly to a method for effecting Web-based network manager using Web configuration.

BACKGROUND OF THE INVENTION

Recently, HTTP (Hypertext Transfer Protocol) has been widely used in communication devices. Further, popularity of the Internet is ever increasing since the introduction of Web browser. For taking advantage of such trend and satisfying the needs of consumers, many communication device manufacturers incorporate Web server feature into their communication devices so as to make them as intelligent devices.

Currently, some communication device manufacturers have incorporate Web configuration into their Web-based communication devices. However, there is no mechanism available for managing the Web in such communication devices. Thus, it is desirable to propose a standard for communicating information among communication devices via HTTP. Further, such standard is viewed as a key factor in effectively managing such communication devices. Moreover, manufacturers can take advantage of the standard to develop a robust network management system which hopefully will be more popular in future network related applications.

In current Web-based communication system, intelligent devices having embedded Web configuration are becoming more and more popular. With the intelligent device, network manager can access the Internet by manipulating Web browser of workstation. Further, a communication is effected through HTTP and HTML (Hypertext Markup Language) by following the instructions shown on screen. As a result, information about communication devices can be obtained. Alternatively, a setting of communication device is made possible. With intelligent device, network manager can manage communication devices through Web browser. However, an effective management of communication devices is impossible if device IP of respective communication device is unknown. This is particularly true in a large network system since the number of communication devices is very large. It is difficult for a Web manager to memorize all device IPs of communication devices. Thus, in conventional Web-based communication devices, it is impossible of effectively managing all communication devices of the network by using Web manager. In addition, as known that a management is effected by Web manager memorizing all device IPs of communication devices and subsequently using Web browser to interconnect all communication devices. In view of above, the management is not effective. Further, the operation is not user friendly.

Thus, it is desirable to provide a novel network management method in order to overcome the above drawbacks of prior art.

SUMMARY OF THE INVENTION

It is therefore an object of the present invention to provide a method for effecting Web-based network manager using Web configuration comprising establishing a manager process module and a manager database module on a workstation; operating the manager database module to use a Hyperlink feature of Hypertext contained in a HTML file to activate a Web browser; enabling a connection to each network device based on node information of each network device stored in the manager database module; and obtaining status information of each network device in a domain from an embedded Web agent in the network device. By utilizing this method, the invention can directly manage network devices through Web browser without additionally installing a management module in the workstation. This can eliminate problem of incapable of obtaining device IPs as experienced in prior art network manager as well as effect a practical while user friendly technique to manage network devices in the domain.

The above and other objects, features and advantages of the present invention will become apparent from the following detailed description taken with the accompanying drawings.

DETAILED DESCRIPTION OF THE PREFERRED EMBODIMENTS

Figure 1:
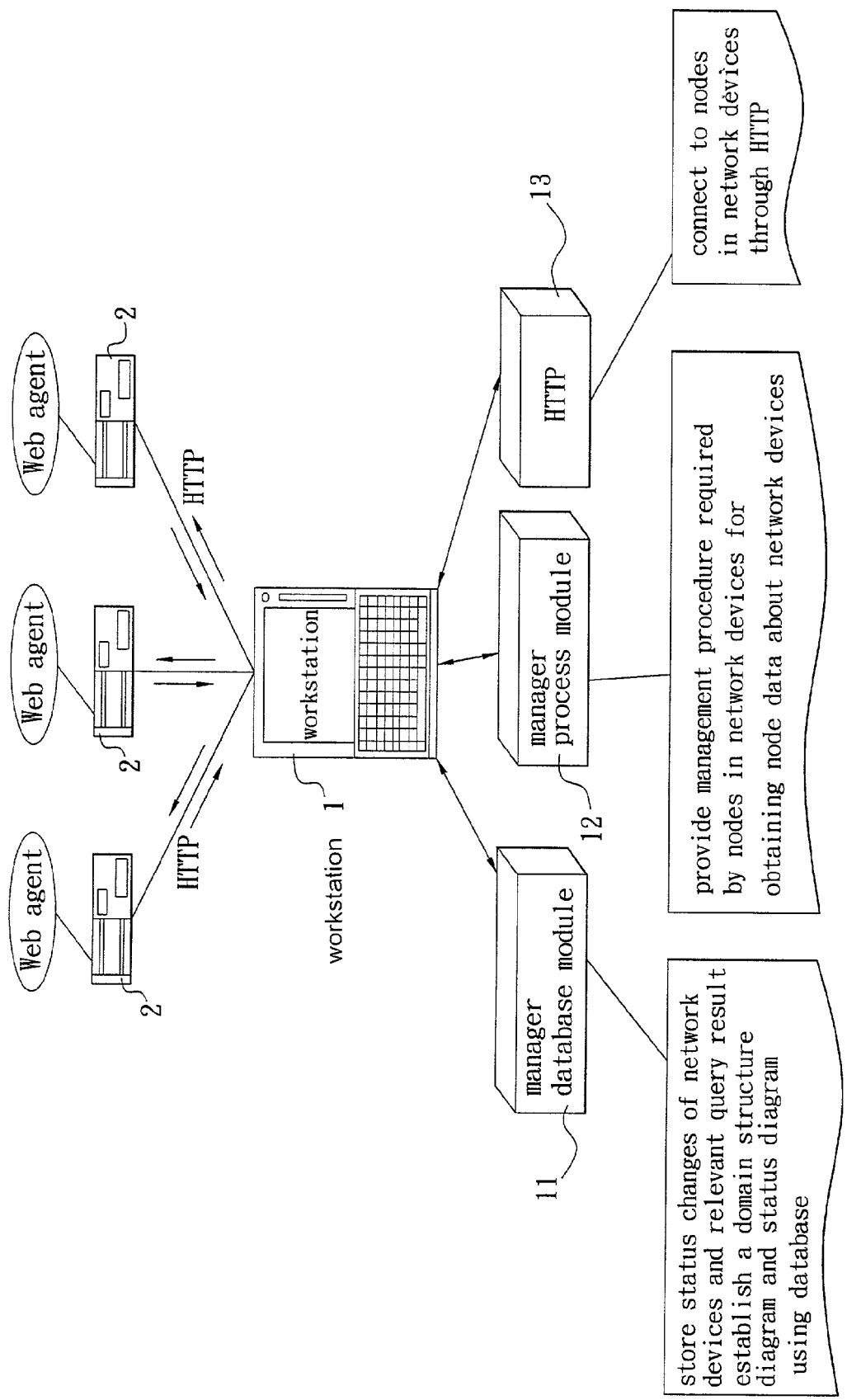
FIG. 1 presents schematically the connection of a system according to the invention.

Referring to FIG. 1, the invention is directed to a method for effecting Web-based network manager using Web configuration comprising establishing a domain consisting of a workstation 1 and at least one network device 2; communicating between workstation 1 and a Web agent on each network device 2 through HTTP; enabling manager database module and manager process module of workstation 1 to communicate with network device 2 using Web browser; and displaying status information of all network devices 2 in the domain on workstation 1 for facilitating a management by Web manager.

In the invention workstation 1 is served as a Web manager. Workstation 1 comprises a manager database module 11, a manager process module 12, and a HTTP process module 13. Manager database module 11 serves to store status changes of network devices in domain and relevant query result and establish a domain structure diagram and status diagram using information contained in the database. Manager process module 12 serves to provide a management procedure required by nodes in network devices 2 so as to obtain node data about network devices 2. HTTP process module 13 serves to connect to nodes in network devices 2 through HTTP. Web agent on network device 2 serves to process Web server.

The invention is related to a method for effecting Web-based network manager using Web configuration. The invention is capable of issuing request and polling message to network devices 2 having Web agent in domain. Next, information about connection of each node on network device 2 is obtained. Such information is then stored in manager database module 11 of workstation 1 by polling. Hence, Web manager can read HTML file from specific directory by operating workstation 1 through the screen of Web browser. As a result, information about nodes in network device 2 of the domain is obtained without requiring to memorize IPs (or other related data) of nodes in network devices 2.

In the domain workstation 1 is coupled to each network device 2 so as to request to read data about Web agent thereof. Further, required packet is sent back to workstation 1 by Web agent. The sent back packet must comply with a specific format and name (e.g., BasicInfo.req, Interface.req, etc.). Thus, packet can be served as a channel for accessing data. Also, workstation 1 can analyze packet through manager process module 12 for obtaining correct information about status, throughput, and distribution of network devices 2 in domain. Packet sent back by Web agent of the invention is summarized as following three types based on content, characteristics, format, and name thereof:

(A) Basic information: It contains data about packets of Web agent such as type, version, location, power on time, device name, etc. as shown in Table I below.

TABLE I

| | Name | Type | Description |
|---|---|---|---|
| 1 | content | String | characteristics or features of network devices |
| 2 | device IP | String | IP of network deviice having a unique definitio |
| 3 | version | String | Software version of Web agent |
| 4 | update time | Long integer | Period of time since power on |
| 5 | device name | String | e.g., D-Link DES-3208 |
| 6 | location | String | Location or region of network device |
| 7 | service layer | Long integer | OSI layer of network device e.g., first layer is hub, second layer is switch or bridge, and third layer is router, etc. |

(B) Interface: It contains data about packets regarding the number of communication interfaces of Web agent. The data structure may be an array as shown in Table II below.

TABLE II

| | Name | Type | Description |
|---|---|---|---|
| 1 | Index | Integer | Index having a unique definition |
| 2 | Content | String | Introduction of interface |
| 3 | Type | Integer | type of interface |
| 4 | Speed | Integer | Transmission speed of interface |
| 5 | MAC address | Physical address | Interface MAC address (e.g., 0080c8112233) |
| 6 | Status | Integer | Current status of interface (e.g., Link up (1)/Link down (2)) |
| 7 | P address | Integer | Interface address (e.g., 10.11.94.1) |

(C) Traffic: It contains data about packets regarding throughput, type, and count of traffic of Web agent. The data structure details throughput and status of each communication interface on Web agent. The data structure may be an array as shown in Table III below.

TABLE III

| | Name | Type | Description |
|---|---|---|---|
| 1 | Index | Integer | Index or code (related to interface data) |
| 2 | InOctets | Count | total number of received octet packets |
| 3 | InUcast | Count | total number of received subnetwork-unicast packets |
| 4 | InNUcastPkts | Count | total number of received non-unicast packets |

TABLE III-continued

| | Name | Type | Description |
|---|---|---|---|
| 5 | InDiscard | Count | total number of discarded inbound packets |
| 6 | InErrors | Count | total number of received error packets |
| 7 | InUnknownProtos | Count | total number of received unknown packets |
| 8 | Outoctets | Count | total number of sent octet packets |
| 9 | OutUcastPkts | Count | Total number of sent subnetwork-unicast packets |
| 10 | OutNUcastPkts | Count | total number of sent non-unicast packets |
| 11 | OutDiscards | Count | total number of discarded outbound packets |
| 12 | OutErrors | Count | total number of sent error packets |

Figure 2:
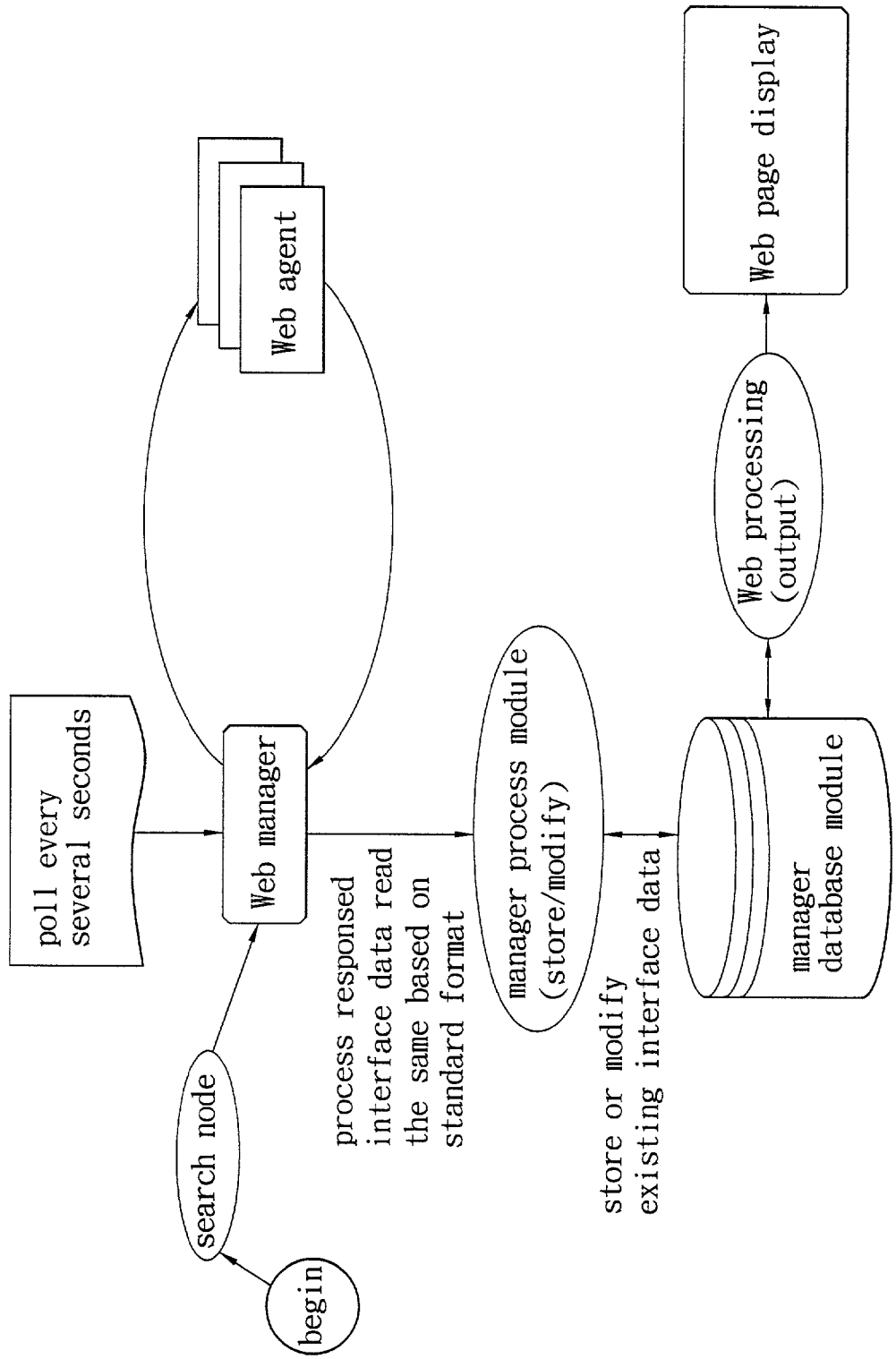
FIG. 2 is a flow chart illustrating an operation according to the invention.

The invention devises a data processing structure by taking advantage of above three basic packet types. Further, the data processing structure using HTTP process module 13 to send packets and take the packets as content in request or response. The operation is illustrated in FIG. 2.

Figure 3:
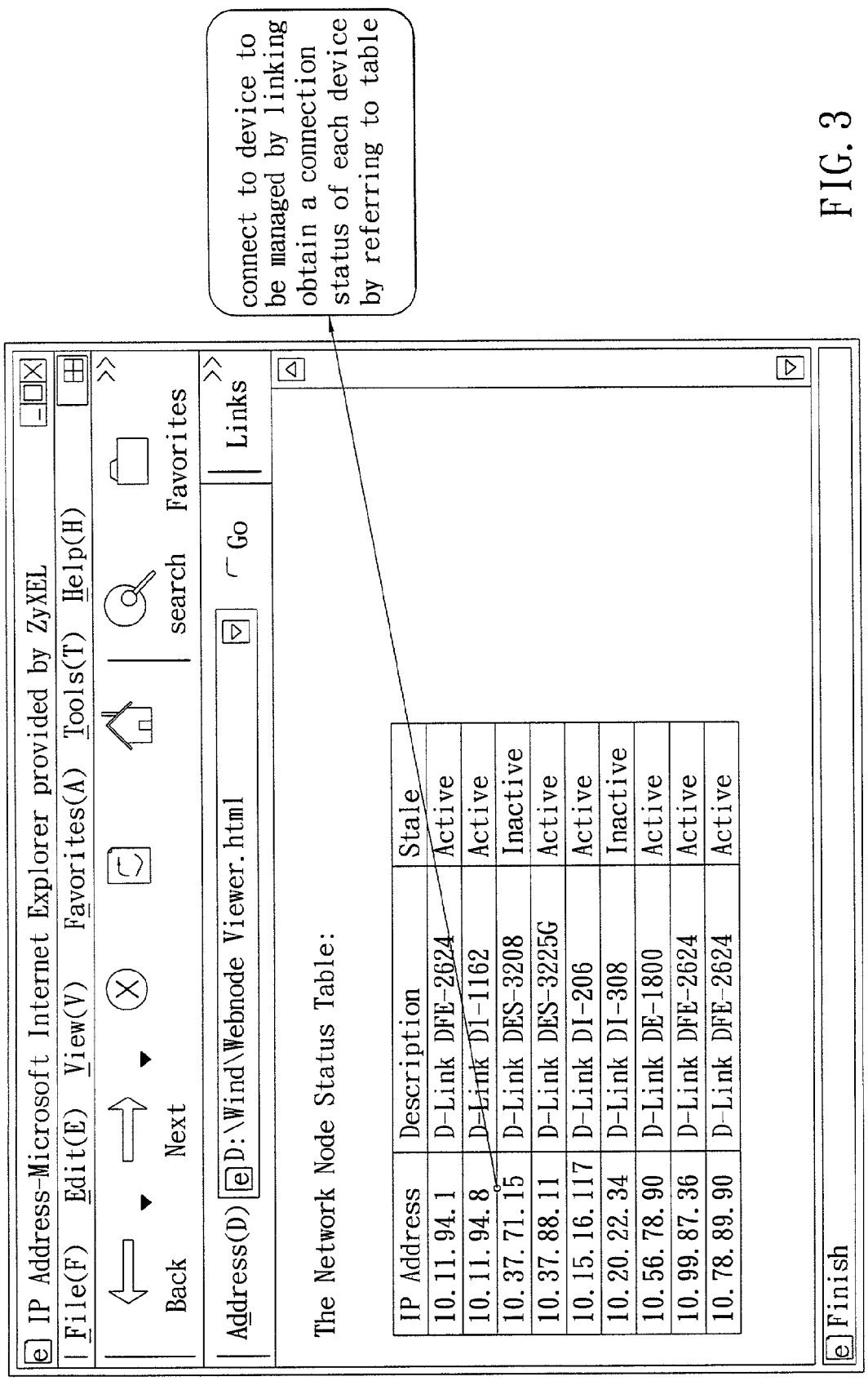
FIG. 3 schematically shows a window appeared on a workstation so as to manage communication devices using Web browser according to the invention.

Every predetermined period of time workstation 1 may request each network device 2 to read data about Web agent thereof through HTTP process module 13 by polling. Further, required packet is sent back to workstation 1 by Web agent. After manager process module 12 of workstation 1 has received the sent back packet (e.g., BasicInfo.req, Interface.req, Traffic.req, . . . etc.), an analysis is performed on packet so as to obtain correct information about node IPs, status, throughput, and distribution of network devices 2 in domain. Next, an update is performed with respect to manager database module 11 of workstation 1 based on the obtained information. Hence, Web manager can read HTML file from specific directory in manager database module 11 by operating workstation 1 through the screen of Web browser. As a result, updated information about nodes in network device 2 of the domain is obtained. This is best shown in FIG. 3. If Web manager desires to manage network device or obtain further information, a Hyperlink feature of Hypertext contained in the Web page may employed to connect to a desired Web page associated with the network device so as to manage the same.

In brief, the invention establishes a manager process module and a manager database module on workstation. Then operates manager database module to use Hyperlink feature of Hypertext contained in HTML file to activate Web browser. Accordingly, enables to connect to each network device based on node information of each network device stored in manager database module. Moreover, status information of each network device in domain is obtained from embedded Web agent in network device. Hence, the invention can directly manage network devices through Web browser without additionally installing a management module in workstation. This can eliminate problem of incapable of obtaining device IPs as experienced in prior art network manager as well as effect a practical while user friendly technique to manage network devices in domain.

While the invention has been described by means of specific embodiments, numerous modifications and variations could be made thereto by those skilled in the art without departing from the scope and spirit of the invention set forth in the claims.

What is claimed is:

1. A method for effecting a Web-based network manager using a Web configuration, the method comprising:

establishing a domain consisting of a workstation and at least one network device;

communicating between the workstation and a Web agent on each network device through a HTTP (Hypertext Transfer Protocol);

enabling a manager database module and a manager process module of the workstation to communicate with each said network device using a Web browser;

enabling use of hypertext contained in at least one HTML file to activate said Web browser and hyperlink to a web page served by said Web agent, said web page associated with a respective one of said network devices;

displaying status information of all of the network devices in the domain on the workstation for facilitating management by a Web managers, wherein the workstation serves as the Web manager, and the manager database module acts to store status changes of the network devices in the domain and relevant query results and establish a domain structure diagram and a status diagram using information contained in the manager database module, wherein the manager process module acts to provide a management procedure required by nodes in each network device so as to obtain node data about each network device, wherein the nodes in each network device are connected by an HTTP process module through the HTTP, wherein the Web agent on each network device acts to process a Web server, wherein the workstation acts to issue a request and polling message to each network device having the web agent in the domain so as to obtain information about each node on each network device, and wherein every predetermined period of time the HTTP process module acts to request each network device to read data about the Web agent thereof by polling and send back a packet required by the Web agent.

2. The method of claim 1, wherein after the manager process module has received the sent back packet, an analysis is performed on the packet for obtaining correct information about Ips of the nodes, status, throughput, and distribution of each network device in the domain, thereby updating the manager database module in the workstation.

3. The method of claim 2, wherein the manager process module acts to read a HTML file from a specific directory in the manager database module and display the same on the workstation to enable said hyperlink.

4. The method of claim 1, wherein the sent back packet comprises:

a basic information for containing data about the packets of the Web agent consisting of type, version, location, power on time, and device name;

an interface for containing data about the packets regarding the number of communication interfaces of the Web agent having a data structure of an array; and a traffic for containing data about the packets regarding throughput, type, and count of the traffic of the Web agent having a data structure containing throughput and status of each communication interface on the Web agent.

* * * * *